United States Patent [19]

Hase et al.

[11] Patent Number: 4,668,711

[45] Date of Patent: May 26, 1987

[54] STABILIZED POLYVINYLCHLORIDE MOLDING COMPOSITIONS

[75] Inventors: Christian Hase, Erkrath; Bernd Wegemund, Haan; Werner Erwied, Langenfeld; Dieter Krampitz, Monchen-Gladbach, all of Fed. Rep. of Germany

[73] Assignee: Henkel Kommanditgesellschaft auf Aktien, Duesseldorf, Fed. Rep. of Germany

[21] Appl. No.: 878,088

[22] Filed: Jun. 24, 1986

[30] Foreign Application Priority Data

Jun. 24, 1985 [DE] Fed. Rep. of Germany ....... 3522554

[51] Int. Cl.$^4$ ................................................ C08K 5/20
[52] U.S. Cl. .................................................... 524/207
[58] Field of Search ................. 524/206, 207; 564/103

[56] References Cited

U.S. PATENT DOCUMENTS

| | | | |
|---|---|---|---|
| 3,509,092 | 4/1970 | Giaimo | 524/207 |
| 3,639,333 | 2/1972 | Baitinger | 524/207 |
| 4,550,203 | 10/1985 | Stockinger et al. | 564/103 |
| 4,595,782 | 6/1986 | Hase et al. | 564/103 |
| 4,618,712 | 10/1986 | Stockinger et al. | 564/103 |

OTHER PUBLICATIONS

Encyclopedia of Polymer Science and Technology, vol. 12, Wiley-Interscience Publications, New York, 1970, pp. 737-768.

J. prakt, Chemie, N.F., vol. 11 (1875), pp. 343-347; vol. 17 (1875), pp. 9-13.

Primary Examiner—Veronica P. Hoke
Attorney, Agent, or Firm—Ernest G. Szoke; Henry E. Millson, Jr.; Mark A. Greenfield

[57] ABSTRACT

The use is disclosed of at least one acylcyanamides of the formula

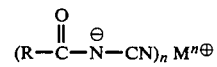

in which the symbol R represents a straight or branched chain alkyl or alkenyl group having from 5 to 21 carbon atoms, such group being unsubstituted or substituted by a OH, O—CH$_2$CH$_2$OH, O—R' group or a mixture thereof, in which R' represents an alkyl group containing from 1 to 4 carbon atoms; in which M is a monovalent or divalent metal cation; and in which n represents the valency of the metal cation to stabilize, thermoplastic molding compositions containing a homopolymer or a copolymer of vinylchloride or a mixture thereof. There is also disclosed heat stabilized thermoplastic molding compositions comprising polyvinylchloride, or a polymer of vinylchloride, and at least one acylcyanamide of Formula I.

19 Claims, No Drawings

STABILIZED POLYVINYLCHLORIDE MOLDING COMPOSITIONS

BACKGROUND OF THE INVENTION

1. Field of the Invention

This invention relates to stabilized thermoplastic molding compositions based on polyvinylchloride or polymers essentially containing vinylchloride.

2. Description of Related Art

In the molding of thermoplastic polymers to tubes, bottles, profiles, films, etc. by processes including extrusion, injection molding, blow-molding, deep-drawing and calendering, degradation of the plastic material involved can occur due to the high temperatures encountered. Degradation is manifested by undesirable discoloration of the plastic and in a deterioration in its mechanical properties.

To prevent, or at least minimize this, stabilizers are added to the polymers before molding to counteract degradation. The heat stabilizers which are used for polyvinylchloride and for copolymers essentially containing vinylchloride are generally inorganic and organic lead salts, organic antimony compounds, organotin compounds and also cadmium/barium carboxylates and phenolates. The foregoing metal compounds are normally termed primary stabilizers, with secondary stabilizers or co-stabilizers often being added to the primary stabilizers to enhance their effectiveness. Additional information relating to the heat stabilizers normally used for vinylchloride polymers can be found in technical literature, as, for example Encyclopedia of Polymer Science and Technology, Vol. 12, Wiley-Interscience Pub., New York, 1970, pages 737 to 768.

The stabilizers mentioned heretofore have, in general, been acceptable in actual use. However, certain polyvinylchloride mixtures yield products having undesirable properties, such as unsatisfactory initial and/or long-term stability values. These values cannot be corrected or improved by modifying the presently known stabilizers or stabilizer mixtures or by increasing the quantities of stabilizer used. In addition, certain objections of a toxicological nature have been raised regarding the use of lead, antimony and cadmium compounds in certain fields. On the other hand, although many organotin compounds are toxicologically safe, their high price is an obstacle to their widespread use. For this reason, attempts have long been made to replace these compounds by safer, inexpensive compounds.

For example, certain fatty acid salts, aromatic carboxylates and phenolates of the metals calcium, barium, zinc and aluminium have been advocated as primary stabilizers, optionally supported by costabilizers such as, for example, organic phosphites, imino compounds, epoxy compounds, polyhydric alcohols of 1,3-diketones. Unfortunately, however, these stabilizer systems do not impart adequate initial stability and/or adequate long-term stability to the molding compositions sought to be stabilized. In particular, undesirable premature termination of long-term stability, reflected by the sudden blackening of the polyvinylchloride molding compositions, is observed when stabilizer combinations which contain unduly large quantities of zinc soaps, are used to improve initial stability. This sudden blackening is known as zinc burning. Accordingly, there is a need for compounds which will provide an initial and/or long-term effect to stabilizer systems for molding compositions based on polyvinylchloride may be distinctly improved.

DESCRIPTION OF THE INVENTION

Other than in the operating examples, or where otherwise indicated, all numbers expressing quantities of ingredients or reaction conditions used herein are to be understood as modified in all instances by the term "about".

It has been found that acylcyanamides, derived from $C_6$-$C_{22}$ fatty acids, of monovalent or divalent metals are quite effective when used to stabilize polyvinylchloride molding compositions. These acylcyanamides may also be used for modifying stabilizer systems which are based on lead, antimony, cadmium/barium and organotin compounds, as well as stabilizer systems based on calcium, barium, zinc and aluminium. In particular, it has been found that the acylcyanamides of toxicologically acceptable monovalent or divalent metal cations are particularly suitable for the production of recently developed stabilizer systems insofar as they provide a means of avoiding the undesirable phenomenon of zinc burning and improving initial stability by replacing the zinc soaps which are normally used with corresponding acylcyanamides.

Accordingly, the present invention relates to stabilized polyvinylchloride molding compositions containing at least one compound having the formula

(I)

in which the symbol R represents a straight-chain or branched alkyl or alkenyl group having from about 5 to about 21, and preferably from about 11 to about 17, carbon atoms which may optionally be substituted by OH—, O—CH$_2$—CH$_2$—OH— and/or O—R'— groups, in which R' is an alkyl group having from 1 to about 4 carbon atoms; wherein M represents a monovalent or divalent metal cation; and wherein n is the valency of the metal cation.

The polyvinylchloride molding compositions of the invention preferably contain acylcyanamides of Formula (I), in which the metal cation is a lithium, sodium, potassium, magnesium, calcium, strontium, barium, manganese, iron, cobalt, nickel, zinc, cadmium, copper and/or lead cation.

Some of the acylcyanamides corresponding to Formula (I) are known compounds.

The acylcyanamides corresponding to Formula (I) can be prepared by methods known per se. The corresponding alkali metal acylcyanamides may be obtained, for example, by reaction of cyanamide with carboxylic acid chlorides and subsequent neutralization with alkali metal hydroxides, carbonates and bicarbonates (see J. prakt. Chemie, N. F. Vol. 11 (1875), pp. 343-347; Vol. 17 (1878), pp. 9-13). On an industrial scale, the alkali metal acylcyanamides can be produced by reaction of cyanamide with alkali metal methylate and fatty acid methylester in stoichiometric quantities in methanol as solvent. A reaction time of from 1 to 5 hours at reflux temperature is generally sufficient to obtain a complete reaction. Since the reaction is quantitative, the product is worked up simply by the removal of the methanol.

The acylcyanamides of divalent metals are best prepared by double decomposition of alkali metal acylcyanamides with water-soluble salts of appropriate metals in aqueous solution. The chlorides, sulfates and acetates of the previously mentioned metals, providing they are readily soluble in water, are suitable for this reaction. The acylcyanamides of the divalent metals, except for the magnesium salts, are poorly soluble in water. Accordingly, they accumulate during production as deposits which have to be filtered off and dried. The magnesium salts precipitate from the concentrated reaction solutions on standing and may be separated off by filtration.

The acyl groups R—CO— of the compounds corresponding to Formula (I) are derived from straight-chain or branched, saturated or unsaturated $C_6$ to $C_{22}$ fatty acids. Thus, for example they are derived from fatty acids emanating from fats and oils of vegetable or animal origin, such as caproic acid, caprylic acid, capric acid, lauric acid, myristic acid, palmitic acid, stearic acid, arachidic acid, behenic acid, palmitoleic acid, oleic acid, erucic acid, linoleic acid and linolenic acid. Such acyl groups may be derived from individual fatty acids or from fatty acid mixtures. In the latter case, they are derived from fatty acid mixtures of the type accumulating in the lipolysis of natural fats and oils. In addition, the acyl groups of the acylcyanamides can also be derived from synthetic branched chain fatty acids containing from about 6 to 22 carbon atoms. The acyl groups can also be derived from fatty acids substituted by OH-groups, for example from ricinoleic acid and hydrogenated ricinoleic acid. The acyl groups can also emanate from fatty acids substituted by O—CH$_2$—CH$_2$—OH— groups and R'—O— groups, wherein the symbol R' is a $C_1$ to $C_4$ alkyl group. Fatty acids such as these may be obtained from epoxy fatty acids, for example, epoxystearic acid, by opening the oxirane ring with ethylene glycol or $C_1$ to $C_4$ alcohols. In a preferred embodiment of the invention, the acyl groups of the acylcyanamides corresponding to Formula (I) are derived from straight-chain, preferably unsubstituted fatty acids containing from about 12 to about 18 carbon atoms, i.e. R in Formula I represents a $C_{11}$ to $C_{17}$ alkyl group.

The acylcyanamides corresponding to Formula (I) are present in the stabilized polyvinylchloride molding compositions of the invention in quantities of from about 0.1 to about 10 parts by weight and, preferably in quantities of from about 0.2 to about 5 parts by weight to 100 parts by weight of polymer.

In the polyvinylchloride molding compositions of this invention, the acylcyanamides manifest an above-average heat-stabilizing effect which, by suitable choice of the metal cations, can be directed both toward enhancing initial stability and also towards improving long-term stability. For example, the long-term stability of PVC-molding compositions can be greatly improved by means of the use of calcium alcylcyanamides. Use of zinc acylcyanamides in this invention has a positive effect on the initial stability of PVC-molding compositions without the undesirable zinc burning, even in large concentrations. In addition, PVC-molding compositions containing acylcyanamides instead of the usual stabilizers, such as metal soaps, are characterized by their improved transparency.

The acylcyanamides corresponding to Formula (I) may be used as the sole primary stabilizers in the polyvinylchloride molding compositions of this invention. However, they can also be used in admixture with other known primary stabilizers, such as, inorganic and organic lead salts, organic antimony compounds, organotin compounds, cadmium/barium carboxylates and phenolates, fatty acid salts, aromatic carboxylates and phenolates of calcium, barium, zinc and aluminium.

In addition to the primary stabilizers mentioned, the stabilized polyvinylchloride molding compositions according to the invention may contain knwon costabilizers, lubricants, plasticizers, antioxidants, additives for improving impact strength, fillers and other auxiliaries.

The stabilized thermoplastic molding compositions according to the invention are based on homopolymers or copolymers of vinylchloride. The copolymers contain at least 50 mole percent and, preferably, at least 80 mole percent, vinylchloride. The polymers may have been produced by any conventional method, for example by suspension, emulsion or block polymerization. Their K-value may be in the range of from about 35 to 80. Molding compositions based on after-chlorinated polyvinylchloride and on resin mixtures predominantly containing homopolymers or copolymers of vinylchloride can also be stabilized as disclosed herein. In the context of the invention, the expression "polyvinylchloride molding compositions" applies both to the semifinished products intended for forming and also to the articles formed from these compositions.

For a fuller understanding of the nature and object of this invention, references may be had to the following examples which are given merely as further illustration of the invention and are not to be construed in a limiting sense.

In the Examples, the percentages set forth are percentages by weight, unless otherwise indicated.

EXAMPLES

1. Production of the acylcyanamides of Formula I

Example 1

In a reaction vessel equipped with a stirrer, dropping funnel, thermometer, gas inlet pipe and reflux condenser, 91.6 grams (2.18 moles) cyanamide were added with stirring under nitrogen at room temperature to 414.5 grams of a 28.4% solution of sodium methylate (118 grams = 2.18 moles) in methanol. 650.7 grams (2.18 moles) of methylstearate were then added, after which the mixture was boiled for about 3 hours under reflux and, finally, was cooled to room temperature.

The stearoyl cyanamide sodium salt was dissolved in the freshly prepared suspension at a temperature of about 80° C. after addition of 1.5 liters water. A solution of 161 grams (1.09 mole) $CaCl_2.2H_2O$ in 250 ml water was then added dropwise with stirring over a period of 1 hour at the same temperature, with a white deposit rapidly forming. The mixture was then stirred for another hour at a temperature of 80° C. The solid product was separated off from the cooled mixture by filtration, washed with water until it was free from chloride, dried in vacuo at 60° C. and then ground to a white powder. The yield was 666.5 g (93.4% of the theoretical).

Analysis: $C_{38}H_{70}N_4O_2Ca$ (MW 655.092): Calculated (%): 69.7 C; 10.8 H; 8.5 N; 4.9 O; 6.1 Ca. Found (%): 66.7 C; 10.8 H; 6.4 N; 4.9 O; 5.8 Ca.

IR-spectrum (in KBr; cm$^{-1}$) 1575, 2190.

Example 2

A solution of 110.3 grams (0.5 mole) zinc acetate dihydrate in 600 ml water was added dropwise with stirring at a temperature of 75° C. to a solution of 246.3 grams (1.0 mole) lauroyl cyanamide sodium salt in 2.4 liters of water, resulting in the formation of a white deposit. After the addition, the mixture was stirred for 1 hour at 75° C. The solid product was separated off by filtration, washed with water until it was free from acetate and then dried in vacuo to constant weight. The yield was 254 grams (99.3% of the theoretical).

Analysis: $C_{26}H_{50}N_4O_2Zn$ (MW 516.38): Calculated (%): 60.5 C; 9.8 H; 10.9 N; 6.2 O; 12.7 Zn. Found (%): 60.4 C; 9.2 H; 10.4 N; 5.0 O; 13.6 Zn.

IR-spectrum (KBr; $cm^{-1}$) 1693, 2225.

Examples 3 to 15

Acylcyanamide salts derived from fatty acids with the following divalent cations: magnesium, barium, lead, cobalt, copper and manganese, were prepared as described in Examples 1 and 2 by double decomposition of acylcyanamide sodium salts with corresponding metal salts. According to analysis, all the salts prepared had the composition (acyl—$CN_2)_2M$ and, except for the magnesium salts, were virtually insoluble in water. In their dry state, the cobalt, copper and manganese salts were respectively blue, pale green and light brown in color. Particulars of a few mixtures for preparing the above-mentioned salts are shown in Table 1.

lengths of 10 mm which were then exposed to a temperature of 180° C. in a Heraeus FT 420 R drying cabinet comprising 6 rotating shelves. Samples were removed at 10 minute intervals and examined for changes in color.

Example 16

A processing aid combination having the following composition (pbw=parts by weight)
100 pbw calcium stearate
20 pbw stearic acid
20 pbw paraffin, Mp. 71° C.
50 pbw pentaerythritol ester of stearic acid (mole ratio 1:1.5; OH number 212)
was prepared by mechanically mixing the components.

Stabilizer compositions A, B, C and D were obtained by adding 5, 10 and 20 pbw zinc lauroyl cyanamide or 20 pbw zinc stearoyl cyanamide, respectively, to, and mixing with, 190 pbw of the processing aid composition specified above.

For comparison tests, stabilizer combinations E, F and G were obtained by adding 5, 10 and 20 pbw zinc stearate to, and mixing with, 190 pbw of the basic for-

TABLE I

Preparation of acylcyanamide Salts of divalent cations

| Example No. | Starting materials | | | | Solvent $H_2O$ (l) | End Products | |
|---|---|---|---|---|---|---|---|
| | Na—acylcyanamide | | Metal Salt | | | Yield % of th. | IR Bands $(cm^{-1})$ |
| | Acyl | Quantity (moles) | Type | Quantity | | | |
| 3 | $C_{12}$ | 1.0 | $mg(OAc)_2.4H_2O$ | 0.5 | 1.8 | 41 | 1570;2180 |
| 4 | $C_{18}$ | 0.8 | $BaCl_2.2H_2O$ | 0.4 | 3.0 | 93 | 1540;2160 |
| 5 | $C_{12}$ | 1.0 | $Pb(OAc)_2.3H_2O$ | 0.5 | 2.0 | 95 | 1690;2150 |
| 6 | $C_{18}$ | 0.8 | $Pb(OAc)_2.3H_2O$ | 0.4 | 4.0 | 94 | 1635;2180 |
| 7 | $C_{18}$ | 0.8 | $Zn(OAc)_2.2H_2O$ | 0.4 | 4.2 | 94 | 1695;2220 |
| 8 | $C_{12}$ | 1.0 | $Co(OAc)_2.4H_2O$ | 0.5 | 2.4 | 95 | 1610;2205 |
| 9 | $C_{18}$ | 0.8 | $Co(OAc)_2.4H_2O$ | 0.4 | 5.5 | 97 | 1610;2205 |
| 10 | $C_{12}$ | 1.0 | $Cu(OAc)_2.H_2O$ | 0.5 | 2.6 | 95 | 1690;2190 |
| 11 | $C_{18}$ | 0.8 | $Cu(OAc)_2.H_2O$ | 0.4 | 6.7 | 99 | 1690;2190 |
| 12 | $C_{12}$ | 1.0 | $MnSO_4.H_2O$ | 0.5 | 2.0 | 95 | 1570;2210 |
| 13 | $C_{18}$ | 0.8 | $MnSO_4.H_2O$ | 0.4 | 3.5 | 98 | 1580;2180 |
| 14 | $C_{16}$ | 2.3 | $CaCl_2.2H_2O$ | 1.2 | 1.8 | 87 | 1585;2185 |
| 15 | $C_{18}(R)*$ | 0.57 | $Zn(OAc)_2.2H_2O$ | 0.285 | 1.25 | 95 | 1695;2220 |

*Acyl group derived from hydrogenated ricinoleic acid

Use of the acylcyanamides corresponding to formula I for stabilizing polyvinylchloride molding compositions Production and testing of the rough sheets In Examples 16 to 26, the effect of the stabilizer combinations was tested with reference to the "static thermal stability" of rough sheets. To this end, polyvinylchloride molding compositions containing stabilizer mixtures were processed for 5 minutes to test sheets on Berstorf laboratory mixing rolls measuring 450×220 mm rotating in the same direction (roll temperature 170° C., roll speed 300 r.p.m.). The sheets, about 0.5 mm thick, were cut into square test specimens having edge mulation indicated above.

The polyvinylchloride molding compounds A' to G' of which the compositions are shown in Table II were obtained by the mechanical mixing of 100 pbw suspension PVC (K-value 70; "Vestolit" S 7054, a product of Chemische Werke Huls, Marl, F.R. Germany) with 2.4 to 3.9 pbw of the stabilizer combinations A to G.

The stabilized polyvinylchloride molding compositions were tested by the method described above. Table II below shows the time after which the first discoloration was observed and then the time after which the test was terminated because of excessive discoloration (stability failure).

TABLE II

| Constituent (pbw) | Polyvinylchloride molding compositions | | | | | | |
|---|---|---|---|---|---|---|---|
| | A' | B' | C' | D' | E' | F' | G' |
| Suspension PVC | 100 | 100 | 100 | 100 | 100 | 100 | 100 |
| Calcium stearate | 1.0 | 1.0 | 1.0 | 1.0 | 1.0 | 1.0 | 1.0 |
| Stearic acid | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 |
| Pentaerythritol stearic acid ester | 0.5 | 0.5 | 0.5 | 0.5 | 0.5 | 0.5 | 0.5 |
| Zinc lauroyl cyanamide | 0.5 | 1.0 | 2.0 | — | — | — | — |
| Zinc stearoyl cyanamide | — | — | — | 2.0 | — | — | — |
| Zinc stearate | — | — | — | — | 0.5 | 1.0 | 2.0 |
| First discoloration (minutes) | 0 | 30 | 30 | 30 | 0 | 20 | 10 |

TABLE II-continued

| Constituent (pbw) | Polyvinylchloride molding compositions |  |  |  |  |  |  |
|---|---|---|---|---|---|---|---|
| | A' | B' | C' | D' | E' | F' | G' |
| Stability failure (minutes) | 30 | 40 | 50 | 50 | 40 | 40 | 30 |

Example 17

A polyvinylchloride molding composition consisting of:
100 pbw suspension PVC (K-value 70; see Example 16)
0.2 pbw stearic acid
0.2 pbw paraffin, Mp. 71° C.
0.5 pbw pentaerythritol ester of stearic acid (molar ratio 1:1.5; OH number 212)
was mixed with stabilizer combinations of this invention comprising:
(a) sodium alumosilicate, calcium stearate and zinc lauroyl cyanamide,
(b) sodium alumosilicate, calcium stearoyl cyanamide and zinc stearate or zinc lauroyl cyanamide
and, for comparison purposes, with stabilizer mixtures of:
(c) sodium alumosilicate, calcium stearate and zinc stearate.

The sodium alumosilicate used was a finely divided synthetic zeolite NaA ($Na_2O:Al_2O_3:SiO_2 = 0.9:1:2.4$; water content 19% by weight). The compositions of the stabilized polyvinylchloride molding compounds H' to Q' thus obtained are shown in the Table III.

The thermoplastic molding compositions H' to Q' were tested for their static thermal stability by the method described above. The results obtained are set out in Table III.

100 pbw suspension PVC (K-value 68; "Vestolit" S 6858, a product of Chemische Werke Huls, Marl, F.R. Germany)
0.2 pbw stearic acid
0.2 pbw paraffin, Mp. 71° C.
0.5 pbw pentaerythritol ester of stearic acid (molar ratio 1:1.5; OH number 212)
with the stabilizer combination R' of
0.5 pbw calcium stearoyl cyanamide
1.0 pbw zinc lauroyl cyanamide
For the preparation of molding compositions S' to AA', the stabilizer combination specified above was modified by the following additions:
(S') 0.5 pbw sodium salt of malic acid
(T') 0.5 pbw sodium salt of tartaric acid
(U') 0.5 pbw tetrol of limonene diepoxide
(V') 0.5 pbw adduct of $C_{12}$-$C_{14}$ alkylamine with 4 moles glycidol
(W') 0.5 pbw rongalite C
(X') 0.5 pbw 3-heptyl-4-hexyl-2-pyrazolin-5-one
(Y') 1.0 pbw sodium alumosilicate (see Example 2)
(Z') 0.2 pbw sodium salt of malic acid 1.0 pbw sodium alumosilicate (see Example 2)
(AA') 0.2 pbw sodium salt of malic acid 0.5 pbw adduct of $C_{12}$-$C_{14}$ alkylamine and 4 moles glycidol.

The compositions of the stabilized polyvinylchloride molding compounds R' to AA' obtained in this way are shown in Table IV.

The molding compositions R' to AA' were tested by the method described heretofore. The results obtained are set out in Table IV.

TABLE III

| Constituent (pbw) | Polyvinylchloride molding compositions |  |  |  |  |  |  |  |  |  |
|---|---|---|---|---|---|---|---|---|---|---|
| | H' | I' | J' | K' | L' | M' | N' | O' | P' | Q' |
| Suspension PVC | 100 | 100 | 100 | 100 | 100 | 100 | 100 | 100 | 100 | 100 |
| Stearic acid | 0.2 | 0.2 | 0.2 | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 | 0.2 | 0.2 | 0.2 |
| Pentaerythritol stearic acid ester | 0.5 | 0.5 | 0.5 | 0.5 | 0.5 | 0.5 | 0.5 | 0.5 | 0.5 | 0.5 |
| Na—alumosilicate | 1.0 | 1.0 | 1.0 | 1.0 | 1.0 | 1.0 | 1.0 | 1.0 | 1.0 | 1.0 |
| Calcium stearate | 1.0 | 1.0 | 1.0 | — | — | — | 1.0 | 0.5 | 1.0 | 1.0 |
| Zinc stearate | — | — | — | 1.0 | — | — | 0.5 | 1.0 | 1.0 | 2.0 |
| Calcium stearoylcyanamide | — | — | — | 0.5 | 0.5 | 1.0 | — | — | — | — |
| Zinc lauroyl cyanamide | 0.5 | 1.0 | 2.0 | — | 1.0 | 2.0 | — | — | — | — |
| First discoloration (minutes) | 0 | 20 | 30 | 20 | 20 | 40 | 0 | 0 | 0 | 0 |
| Stability failure (minutes) | 50 | 60 | 60 | 50 | 60 | 70 | 70 | 40 | 50 | 40 |

Example 18

The thermoplastic molding compositions R' was obtained by mixing

TABLE IV

| Constituent (pbw) | Polyvinylchloride molding compositions |  |  |  |  |  |  |  |  |  |
|---|---|---|---|---|---|---|---|---|---|---|
| | R' | S' | T' | U' | V' | W' | X' | Y' | Z' | AA' |
| Suspension PVC | 100 | 100 | 100 | 100 | 100 | 100 | 100 | 100 | 100 | 100 |
| Stearic Acid | 0.2 | 0.2 | 0.2 | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 | 0.2 | 0.2 | 0.2 |
| Pentaerythritol stearic acid ester | 0.5 | 0.5 | 0.5 | 0.5 | 0.5 | 0.5 | 0.5 | 0.5 | 0.5 | 0.5 |
| Calcium stearoyl cyanamide | 0.5 | 0.5 | 0.5 | 0.5 | 0.5 | 0.5 | 0.5 | 0.5 | 0.5 | 0.5 |
| Zinc lauroyl cyanamide | 1.0 | 1.0 | 1.0 | 1.0 | 1.0 | 1.0 | 1.0 | 1.0 | 1.0 | 1.0 |
| Malic acid, Na—salt | — | 0.5 | — | — | — | — | — | — | 0.2 | 0.2 |
| Tartaric acid, Na—salt | — | — | 0.5 | — | — | — | — | — | — | — |
| Limonene-tetrol | — | — | — | 0.5 | — | — | — | — | — | — |
| Alkylamine + 4 glycidol | — | — | — | — | 0.5 | — | — | — | — | — |
| Rongalit C | — | — | — | — | — | 0.5 | — | — | — | — |
| 3-Heptyl-4-hexyl-2-pyrazolin-5-one | — | — | — | — | — | — | 0.5 | — | — | — |
| Na—alumosilicate | — | — | — | — | — | — | — | 1.0 | 1.0 | — |

TABLE IV-continued

| Constituent (pbw) | Polyvinylchloride molding compositions | | | | | | | | | |
|---|---|---|---|---|---|---|---|---|---|---|
| | R' | S' | T' | U' | V' | W' | X' | Y' | Z' | AA' |
| First discoloration (minutes) | 20 | 0 | 30 | 30 | 30 | 0 | 10 | 20 | 20 | 30 |
| Stability failure (minutes) | 30 | 60 | 50 | 40 | 40 | 50 | 50 | 50 | 60 | 50 |

Example 19

1.0 pbw of an acylcyanamide sodium salt, of which the acyl group was derived from a $C_6$ to $C_{10}$ fatty acid mixture, was added to and mixed with a basic formulation of
- 100 pbw suspension PVC (K-value 70; "Vestolit" S 7054, a product of Chemische Werke Huls, Marl, F.R. Germany)
- 1.0 pbw calcium stearate
- 0.5 pbw zinc stearate
- 0.2 pbw stearic acid
- 0.2 pbw paraffin, Mp 71° C.
- 0.5 pbw pentaerythritol ester of stearic acid (molar ratio 1:1.5; OH number 212)

The stabilized molding composition was subjected to the static thermal stability test. The first discoloration was observed after 10 minutes and stability failure occurred after 50 minutes.

Example 20

1.0 pbw lauroyl cyanamide magnesium salt (Example 3) was added to and mixed with the basic formulation of Example 19. In the static thermal stability test, the first discoloration of the stabilized molding composition was observed after 10 minutes and stability failure occurred after 40 minutes.

Example 21

0.5 pbw stearoyl cyanamide barium salt (Example 4) was added to and mixed with a basic formulation of
- 100 pbw suspension PVC (K-value 70; "Vestolit" S 7054, a product of Chemische Werke Huls, Marl, F.R. Germany)
- 0.2 pbw zinc-2-ethylhexanoate
- 0.4 pbw trilaurylphosphite The stabilized molding composition was subjected to the static thermal stability test. The first discoloration was observed after 10 minutes and stability failure occurred after 40 minutes.

Example 22

2.0 pbw stearoyl cyanamide lead salt (Example 6) was added to and mixed with a basic formulation of
- 100 pbw suspension PVC (K-value 58; "Solvic" 258 RA, a product of Deutsche Solvay-Werke GmbH, Soligen, F.R. Germany)
- 0.3 pbw calcium stearate
- 1.0 L pbw isotridecylstearate In the testing of the stabilized molding composition by the static thermal stability test, the first discoloration was observed after 10 minutes and stability failure occurred after 90 minutes. The molding compounds of this invention show considerably better transparency than other molding compounds which have the same composition, but which contain, instead of lead acylcyanamide, the same quantity of tribasic lead sulfate.

Example 23

0.1 pbw lauroyl cyanamide cobalt salt (Example 8) was added to, and mixed with, the basic formulation of Example 19. The stabilized molding composition was subjected to the static thermal stability test. The first discoloration was observed after 30 minutes and stability failure occurred after 40 minutes.

Example 24

0.1 pbw lauroyl cyanamide manganese salt was added to and mixed with the basic formulation of Example 19. In the testing of the stabilized molding composition by the static thermal stability test, the first discoloration was observed after 30 minutes and stability failure occurred after 40 minutes.

Example 25

0.1 pbw stearoyl cyanamide manganese salt was added to and mixed with the basic formulation of Example 19. In the static thermal stability test, the stabilized molding composition showed the first discoloration after 30 minutes; stability failure was observed after 40 minutes.

Example 26

0.5 g of an acylcyanamide zinc salt, of which the acyl group was derived from a hydrogenated ricinoleic acid, was added to and mixed with a basic formulation of
- 100 pbw suspension-PVC (K-value 61; "Vinoflex" S 6115, a product of BASF AG, Ludwigshafen, F.R. Germany)
- 1.0 pbw calcium stearate
- 0.5 pbw zinc stearate The stabilized molding composition was subjected to the static thermal stability test. The first discoloration was observed after 10 minutes and stability failure occurred after 40 minutes.

We claim:

1. A stabilized molding composition comprising
    (a) polyvinyl chloride or a vinyl chloride copolymer and (b) a thermal stabilizing amount of at least one acylcyanamide stabilizer having the formula

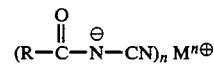

in which the symbol R represents a straight or branched chain alkyl or alkenyl group having from 5 to 21 carbon atoms, such group being unsubstituted or substituted by an OH, O—$CH_2CH_2OH$, O—R' group or a mixture thereof, in which R' represents an alkyl group containing from 1 to 4 carbon atoms; in which M is a monovalent or divalent metal cation; and in which n represents the valency of the metal cation.

2. The composition of claim 1 wherein, in Formula I, the symbol R is an alkyl or alkenyl group having from 11 to 17 carbon atoms and wherein the symbol M represents lithium, sodium, potassium, magnesium, calcium, strontium, barium, manganese, iron, cobalt, nickel, zinc, cadmium, copper or lead.

3. The composition of claim 2 wherein R is an alkyl group having 11 carbon atoms.

4. The composition of claim 2 wherein R is an alkyl group having 15 carbon atoms.

5. The composition of claim 2 wherein R is an alkyl group having 17 carbon atoms.

6. The composition of claim 3 wherein the alkyl group is substituted or unsubstituted.

7. The composition of claim 4 wherein the alkyl group is substituted or unsubstituted.

8. The composition of claim 5 wherein the alkyl group is substituted or unsubstituted.

9. The composition of claim 8 wherein the alkyl group is substituted and derived from ricinoleic acid, hydrogenated ricinioleic acid or epoxystearic acid.

10. The composition of claim 2 wherein the cation represented by the symbol M is calcium.

11. The composition of claim 2 wherein the cation represented by the symbol M is zinc.

12. The composition of claim 2 wherein the cation represented by the symbol M is magnesium.

13. The composition of claim 1 wherein the acylcyanamide stabilizer of Formula I is present in admixture with another primary stabilizer.

14. The composition of claim 1 wherein there is also present a co-stabilizer, lubricant, plasticizer, antioxidant, additive for improving impact strength, filler, or a mixture of any two or more of such materials.

15. The composition of claim 2 wherein the acylcyanamide of Formula I is present in a quantity of from about 0.1 to about 10 parts by weight for each 100 parts by weight of polymer present.

16. The composition of claim 15 wherein the acylcyanamide of Formula I is present in a quantity of from about 0.2 to about 5 parts by weight for each 100 parts by weight of polymer present.

17. A process for producing a heat stabilized polyvinyl chloride molding composition which comprises adding at least one acylcyanamide having the formula

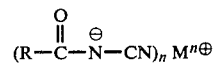

in which the symbol R represents a straight or branched chain alkyl or alkenyl group having from 5 to 21 carbon atoms, such group being unsubstituted or substituted by a OH, O—CH$_2$CH$_2$OH, O—R' group or a mixture thereof, in which R' represents an alkyl group containing from 1 to 4 carbon atoms; in which M is a monovalent or divalent metal cation; and in which n represents the valency of the metal cation
to a polyvinylchloride-containing composition and mixing same therein in a ratio of from about 0.1 to about 10 parts by weight of said acylcyanamide for each 100 parts by weight of the polymer present.

18. The process of claim 17 wherein the polyvinylchloride-containing composition is a copolymer comprising at least 50 mole percent of vinylchloride.

19. The process of claim 18 wherein the polyvinylchloride-containing composition is a copolymer comprising at least 80 mole percent of vinylchloride.

* * * * *